United States Patent
Baker et al.

(10) Patent No.: US 6,503,660 B2
(45) Date of Patent: Jan. 7, 2003

(54) LITHIUM ION BATTERY CONTAINING AN ANODE COMPRISED OF GRAPHITIC CARBON NANOFIBERS

(76) Inventors: R. Terry K. Baker, 12 Old Stable Dr., Mansfield, MA (US) 02048; Nelly M. Rodriguez, 12 Old Stable Dr., Mansfield, MA (US) 02048

( * ) Notice: Subject to any disclaimer, the term of this patent is extended or adjusted under 35 U.S.C. 154(b) by 0 days.

(21) Appl. No.: 09/731,276

(22) Filed: Dec. 6, 2000

(65) Prior Publication Data

US 2002/0102461 A1 Aug. 1, 2002

(51) Int. Cl.⁷ .............................................. H01M 10/24
(52) U.S. Cl. .............................. 429/231.95; 429/231.8
(58) Field of Search ........................ 429/231.95, 231.8

(56) References Cited

U.S. PATENT DOCUMENTS

| | | | |
|---|---|---|---|
| 4,263,376 A | | 4/1981 | Blurton ........................ 429/42 |
| 4,663,230 A | * | 5/1987 | Tennet ......................... 428/367 |
| 4,851,377 A | | 7/1989 | Breault ........................ 502/101 |
| 5,277,996 A | | 1/1994 | Marchetti et al. ............. 429/44 |
| 5,340,670 A | * | 8/1994 | Takami et al. ............... 429/194 |
| 5,653,951 A | * | 8/1997 | Rodriguez et al. .......... 423/439 |
| 5,874,166 A | * | 2/1999 | Chu et al. .................... 428/368 |
| 5,879,836 A | * | 3/1999 | Ikeda et al. ............... 429/231.8 |

FOREIGN PATENT DOCUMENTS

JP  63-230512  9/1988

OTHER PUBLICATIONS

M. Inagaki; "Applications of graphite intercalation compounds"; Journal of Materials Research, vol. 1, No. 6, Nov./Dec. 1989; pp 1560–1568.

M. S. Dresselhaus, et al.; "Fullerenes"; Journal of Materials Research, vol. 8, No. 8, Aug. 1993; pp 2054–2097.

T. Kasuh, et al; "Recent trends in carbon negative electrode materials"; Journal of Power Sources, vol. 68; 1997; pp 99–101.

Hang Shi; "Coke vs. graphite as anodes for lithium–ion batteries"; Journal of Power Sources, vol. 75; 1998; pp 64–72.

B. Markovsky, et al.; "The basic electroanalytical behavior of practical graphite–lithium intercalation electrodes"; Electrochimica Acta, vol. 43, Nos. 16 and 17, (1998) pp 2287–2304.

D. Bar–Tow, et al.; A Study of Highly Oriented Pyrolytic Graphite as a Model for the Graphite Anode in Li–Ion Batteries:,;Journal of the Electrochemical Society, 146 (3), (1999) pp 824–832;.

B. Simon, et al.; "On the Choice of Graphite for Lithium Ion Batteries"; Journal of Power Sources 81–82, (1999) pp 312–316.

Yuichi Sato, et al.; "Characteristics of Coke Carbon Modified with Mesophase–Pitch as a Negative Electrode for Lithium Ion Batteries"; Journal of Power Sources 81–82, (1999) pp 182–186.

E. Theodoridou et al.; "Carbon fibre–supported noble metal catalysts; Optimization of fibre pretreatment"; Synthetic Metals, vol.4, 1986; pp 125–132.

* cited by examiner

Primary Examiner—Patrick Ryan
Assistant Examiner—M. Wills
(74) Attorney, Agent, or Firm—Henry E. Naylor

(57) ABSTRACT

A lithium ion secondary battery having an anode comprised of substantially crystalline graphitic carbon nanofibers composed of graphite sheets. The graphite sheets are preferably substantially perpendicular or parallel to the longitudinal axis of the carbon nanofiber. This invention also relates to the above-mentioned electrode for use in lithium ion secondary batteries.

13 Claims, 2 Drawing Sheets

LITHIUM ION BATTERY CONTAINING AN ANODE COMPRISED OF GRAPHITIC CARBON NANOFIBERS

FIELD OF THE INVENTION

The present invention relates to a lithium ion secondary battery having an anode comprised of substantially crystalline graphitic carbon nanofibers composed of graphite sheets. The graphite sheets are substantially perpendicular or parallel to the longitudinal axis of the carbon nanofiber. This invention also relates to the above-mentioned electrode for use in lithium ion secondary batteries.

BACKGROUND OF THE INVENTION

Lithium ion secondary batteries are currently the leading portable energy storage device for the consumer electronics market. They are comprised of selected carbon materials as an anode, a lithium transition metal oxide such as $LiCoO_2$, $LiNiO_2$ or $LiMnO_2$ as the cathode, and an electrolyte typically comprised of a lithium salt in an organic solvent. The ability to intercalate lithium into the carbon structure of the anode usually determines the performance of the battery. The performance of lithium ion secondary batteries, such as the charge/discharge capacity, voltage profile and cyclic stability, strongly depends on the microstructure of the carbon anode material. Types of carbon materials that have been investigated for use in lithium ion batteries include both graphitic carbons and non-graphitic carbons, such as semi-coke and glass-like carbons. Graphites and graphitized soft carbons have been studied the most because of their desirable high volumetric reversible capacity and their low electrode potential relative to lithium metal. Graphite materials are preferred because of their ability to intercalate lithium. When graphite is used as an anode-active material, the quantity of lithium inserted between the layers is typically one lithium atom to six carbon atoms. Thus, the theoretical capacity of carbon, per unit weight, is 372 mAh/g.

Lithium ions move back and forth between electrodes during the charging and discharging processes of the battery. During the battery charging process, Li ions from the cathode move through an electrolyte, collect an electron and proceed to intercalate within the carbon structure of the anode. The opposite reaction takes place during discharging, i.e. the neutral Li ions deintercalates, loses an electron to form $Li^+$, and diffuse towards the cathode. Useful work is obtained by circulating the electron through an external circuit. The oxide lattice of the cathode captures the electron where the transition metal oxide undergoes reduction. Equation 1 below illustrates the charge/discharge total reaction of a Li-Ion battery. The half reaction occurring at the anode, that is based on $Li^+$ intercalation and deintercalation of carbon, is shown in Equation 2 below:

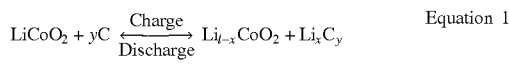

Equation 1

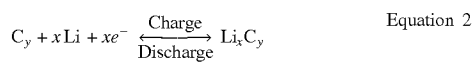

Equation 2

Carbon materials suggested for use as an anode for batteries are disclosed in Recent Trends in Carbon Negative Electrode Materials, T. Kasuh et al., Journal of Power Sources 68 (1997) pages 99–101; The Basic Electroanalytical Behavior of Practical Graphite-Lithium Intercalation Electrodes, B. Markovsky et al., Electrochimica Acta, Vol. 43, Nos. 16 and 17, (1998) pages 2287–2304; On the Choice of Graphite for Lithium Ion Batteries, B. Simon, Journal of Power Sources 81–82, (1999) pages 312–316; A Study of Highly Oriented Pyrolytic Graphite as a Model for the Graphite Anode in Li-Ion Batteries, Journal of the Electrochemical Society, 146 (3), (1999) pages 824–832; Characteristics of Coke Carbon Modified with Mesophase-Pitch as a Negative Electrode for Lithium Ion Batteries, Y. Sato et al., Journal of Power Sources 81–82, (1999) pages 182–186; Coke vs. Graphite as Anodes for Lithium-Ion Batteries, Hang Shi, Journal of Power Sources 75, (1998) pages 64–72. All of these articles are incorporated herein by reference. The carbon materials disclosed in the above publications do not exhibit a sufficient capacity, in the potential range, for use as anodes in commercial batteries. One reason for this is an undesirable linear increase in potential during the deintercalation of lithium. This is true even if the carbon material has a certain capacity, as seen from cokes, when used as an electrode material.

Also, when an electrode is manufactured using a carbon material, bulk density is an important factor. Japanese Laid-Open Patent No. 63-230512 teaches that a powdered graphite cannot provide sufficient capacity as an active material in Li-Ion batteries because the degree of crystalline perfection is not sufficiently high.

Recently, nanocarbons, such as multi-walled carbon nanotubes and fibrils have been suggested for use in lithium ion batteries. U.S. Pat. No. 5,879,836 teaches the use of fibrils as the material for the lithium ion battery anode. Fibrils are described, in that patent, as being composed of parallel layers of carbon in the form of a series of concentric tubes disposed about the longitudinal axis, rather than as multi-layers of flat graphite sheets, as in the carbon nanofibers used in the present invention. Carbon fibrils are similar in structure to the so-called "buckytubes", or nanotubes, that are described in an article entitled Fullerenes, M. S. Dresselhaus, et al, Journal of Materials Research, Vol. 8, No. 8, August 1993, pages 2087–2092, and is incorporated herein by reference. Fullerenes are $C_n$ cage molecules built from a collection of hexagonal and pentagonal faces. The $C_{60}$-derived tubules can be defined, in simplest terms, by bisecting a $C_{60}$ molecule at the equator and joining the two resulting hemispheres with a cylindrical tube, one monolayer thick and having the same diameter as the $C_{60}$ molecule. Carbon nanotubes can also be defined as substantially hollow structures comprised of substantially parallel graphite circular layers aligned at distances of about 0.335 nm to 0.67 nm from each other.

While lithium ion batteries have met with some commercial success using conventional carbon materials, there remains a need for lithium-ion batteries that can achieve a higher level of performance than those currently available.

SUMMARY OF THE INVENTION

In accordance with the present invention, there is provided a lithium ion battery comprising an anode, a cathode and an electrolyte, wherein the anode is comprised of substantially crystalline graphitic carbon nanofibers comprised of graphite sheets that are aligned in directions that are perpendicular or parallel to the longitudinal axis of the nanofibers, wherein the distance between graphite sheets is from about 0.335 nm to about 0.67 nm, and having a crystallinity greater than about 95%.

In a preferred embodiment of the present invention, the graphite sheets are substantially perpendicular to the longitudinal axis of the nanofiber.

In another preferred embodiment of the present invention, the nanofiber is one wherein the distance between the graphite sheets is from about 0.335 and 0.40 nm In yet another preferred embodiment of the present invention, the cathode is comprised of a lithium transition oxide selected from the group consisting of $LiCoO_2$, $LiNiO_2$ and $LiMnO_2$.

In still another preferred embodiment of the present invention, the degree of crystallinity of the nanofibers are at least about 98%.

DETAILED DESCRIPTION OF THE INVENTION

Figure 1:
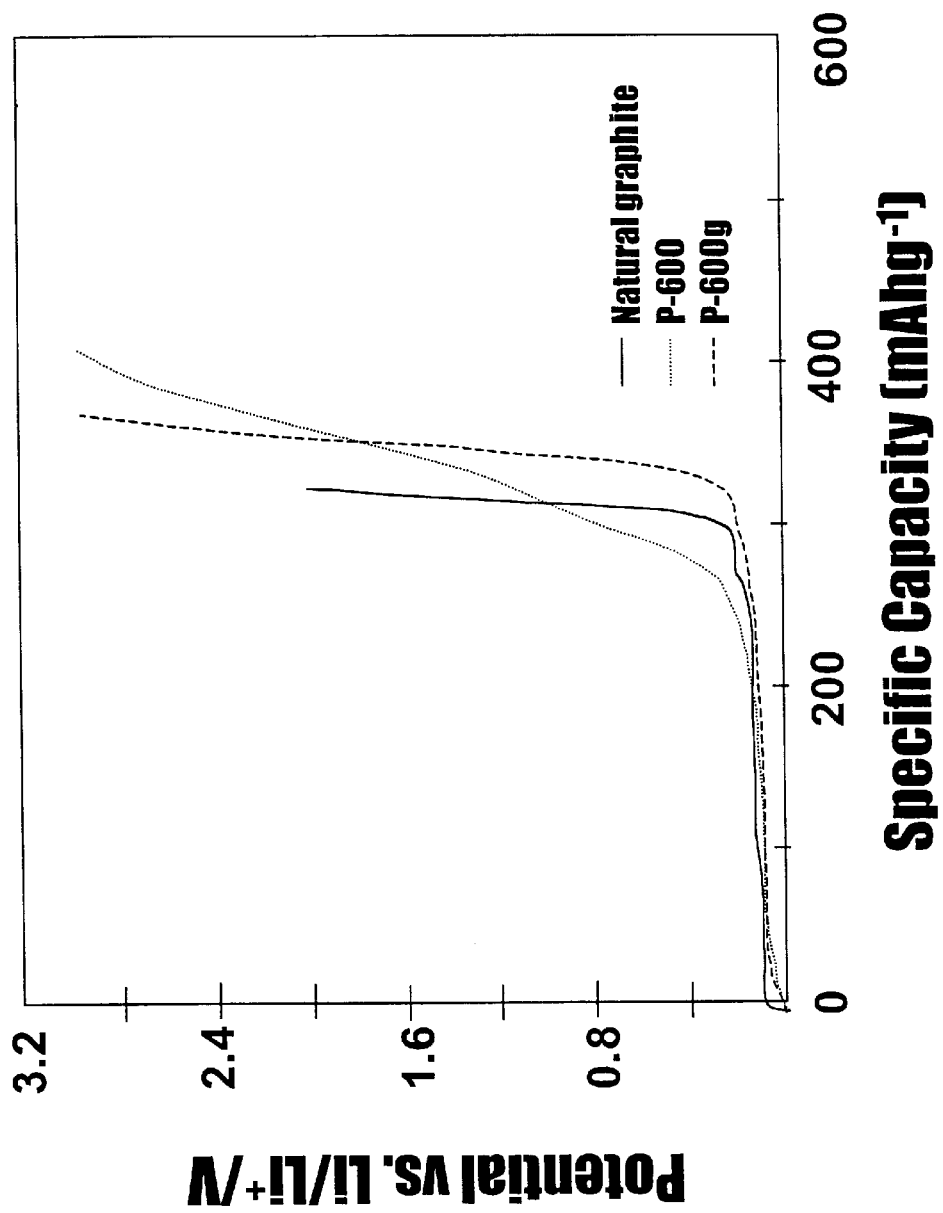
FIG. 1 shows voltage profiles for Li/carbon cells for P600, P600g, and Brazilian natural graphite.

As previously stated, lithium ion secondary batteries are currently the leading portable energy storage device for the consumer electronics market. They are comprised of selected carbon materials as an anode, a lithium transition metal oxide such as $LiCoO_2$, $LiNiO_2$ or $LiMnO_2$ as the cathode, and an electrolyte which typically consists of a lithium salt in an organic solvent. Non-limiting examples of lithium salts used as the electrolyte include $LiClO_4$, $LiBF_4$, and $LiPF_6$ The ability to intercalate lithium into the carbon structure of the anode typically determines the performance of the battery. For example, the more lithium that can be intercalated the higher the performance. Also, the performance of lithium ion secondary batteries, such as the charge/discharge capacity, voltage profile and cyclic stability strongly depends on the microstructure of the carbon anode material, which in this invention are graphitic carbon nanofibers comprised of graphite sheets. The carbon nanofibers used in the present invention possess novel structures in which the graphite sheets constituting the materials are aligned in directions either perpendicular to or parallel to the fiber axis and sometimes designated herein as "platelet" and "ribbon", respectively. The important criteria is that there be edge sites associated with the nanofiber. In all cases, the exposed surfaces of the nanofibers of the present invention are comprised of over 95% edge regions, in contrast to conventional graphite that consists almost entirely of basal plane regions (about 95%), having few edge sites (about 5%). The edge regions, or sites, consist of carbon atoms having a free valency site.

The carbon nanofibers of the present invention were prepared from the metal catalyzed decomposition of mixtures or carbon monoxide/hydrogen at temperatures ranging from about 500° C. to about 770° C. according to methods below, as well as methods disclosed in U.S. Pat. No. 5,653,951, which is incorporated herein by reference. Prior to use in battery applications, the nanofibers were treated with dilute hydrochloric acid for a period of at least 7 days in order to remove metal particles that were left over from nanofiber growth. The nanofibers were then rinsed in deionized water at room temperature and dried at 110° C. in air. These carbon nanofibers have a unique set of properties that include: (i) a nitrogen surface area from about 40 to 250 $m^2/g$; (ii) an electrical resistivity of 0.4 ohm·cm to 0.1 ohm·cm; (iii) a crystallinity from about 95% to 100%; and (iv) a spacing between adjacent graphite sheets of 0.335 nm to about 1.1 nm, preferably from about 0.335 nm to about 0.67 nm, and most preferably from about 0.335 to about 0.40 nm.

As mentioned above, the nanofibers used in the present invention were grown from a suitable metal catalyst in a vapor-phase environment resulting from the decomposition of carbon monoxide admixed with hydrogen. Catalysts that can be used to prepare these carbon nanofibers are iron, iron:copper iron:nickel and nickel:copper bulk bimetallic catalysts in powder form. It is well established that the ferromagnetic metals, iron, cobalt, and nickel, are active catalysts for the growth of carbon nanofibers during the decomposition of carbon monoxide and certain hydrocarbons. Efforts are now being directed at modifying the catalytic behavior of these metals, with respect to carbon nanofiber growth, by introducing other metals and non-metals into the system. In this respect, copper is an enigma appearing to be relatively inert towards carbon deposition during the $CO/H_2$ reaction. Thus, it is unexpected that the combination of Cu with Fe has such a dramatic effect on carbon nanofiber growth in the $CO/H_2$ system.

The average powder particle size of the metal catalyst will range from about 0.5 nanometer to about 5 micrometer, preferably from about 2.5 nanometer to about 1 micrometer. In a preferred bimetallic system, the ratio of the two metals can be any effective ratio that will produce substantially crystalline ($\geq 95\%$) carbon nanofibers in which the graphite sheets are substantially perpendicular to the longitudinal axis of the nanofiber at temperatures from about 550° C. to about 670° C. in the presence of a mixture of $CO/H_2$. The ratio of CO to $H_2$ will preferably be from about 4:1 to 1:4. The ratio of iron:copper will, typically, be from about 5:95 to about 95:5, preferably from about 3:7 to about 7:3; and most preferably from about 6:4 to about 7:3. The bimetallic catalyst can be prepared by any suitable technique. One preferred technique is by co-precipitation of aqueous solutions containing soluble salts of the two metals. Preferred salts include the nitrates, sulfates, and chlorides of iron and copper, particularly iron nitrate and copper nitrate. The resulting precipitates are dried and calcined to convert the salts to the mixed metal oxides. The calcined metal powders are then reduced at an effective temperature and for an effective time.

The preferred iron:copper catalyst powders used in the present invention to produce "platelet" nanofibers were prepared by the co-precipitation of aqueous solutions containing appropriate amounts of iron and copper nitrate with ammonium bicarbonate. The precipitates were dried overnight at 110° C. before being calcined in air at 400° C. to convert the resulting carbonates to mixed metal oxides. The calcined powders were then reduced in hydrogen for 20 hours at 400° C. Following this treatment, the reduced catalyst was cooled to about room temperature (220° C.), in a helium environment, before being passivated in a 2% oxygen/helium mixture for 1 hour at about room temperature (24° C.).

Gas flow reactor experiments were carried out in a horizontal quartz tube (40 mm I.D. and 90 cm long) contained in a Lindberg tube furnace at temperatures over the range of about 450° C. to 700° C. Gas flow rates to the reactor were regulated with MKS mass-flow controllers. In a typical experiment, 50 mg of the given catalyst powder was dispersed in a substantially uniform manner along the base of a ceramic boat, which was subsequently placed at the center of the reactor tube. After reduction of the sample at 600° C. for 2 hours, the system was flushed with helium and brought to the desired temperature level before being reacted with in the CO/$H_2$ mixture for a period of 2 hours. The total amount of solid carbon formed, in any given experiment, was determined at the completion of the reaction by weight difference. The composition of the gas phase was measured at regular intervals by taking samples of the inlet and outlet streams, which were then analyzed by gas chromatography using a 30 m megabore (CS-Q) capillary column in a Varian 3400 GC unit. Carbon and hydrogen atom balances, in combination with the relative concentrations of the respective components, were applied to obtain the various product yields. In order to obtain reproducible carbon deposition data, it was necessary to follow an identical protocol for each experiment.

The structural details of the carbon materials resulting from the interaction of the CO/$H_2$ mixtures with the various powdered bimetallic catalysts were examined in a JEOL 2000 EX II transmission-electron microscope that was fitted with a high-resolution pole piece capable of providing a lattice resolution of 0.18 nm. Temperature-programmed oxidation studies (TPO) of the various carbon materials were carried out in a Cahn 2000 microbalance in the presence of a $CO_2$/Ar (1:1) mixture. The heating rate was that of 5°/min, up to a maximum of a given carbon deposit from a comparison of the oxidation profile with those of two standard materials, amorphous carbon and single crystal graphite when treated under the same conditions.

The inventors hereof have found that only a mixture of CO and $H_2$ will yield carbon nanofibers with unexpected high crystallinities. That is, crystallinities equal to or greater than about 95%, preferably greater than 97% more preferably greater than 98%, and most preferably substantially 100%.

As previously mentioned, after the nanofibers are grown it may be desirable to treat them with an aqueous solution of an inorganic acid, such as a mineral acid, to remove excess catalyst particles, if present. Non-limiting examples of suitable mineral acids include sulfuric acid, nitric acid, and hydrochloric acid. Preferred is sulfuric acid.

It is within the scope of this invention to increase the spacing between the graphite sheets by any suitable means, such as by intercalation. Intercalation involves incorporating an appropriate intercalation compound between platelets. Intercalation compounds suitable for graphite structures are comprehensively discussed in Applications of Graphite Intercalation Compounds, M. Inagaki, Journal of Material Research, Vol. 4, No.6, November/December 1989 and M. S. Dresselhaus, et al., Advances in Physics, 1981, 30 No. 2, 139, both of which are incorporated herein by reference. The preferred intercalation compounds for use with the nanofibers of the present invention are alkali and alkaline-earth metals. The limit to which the platelet spacing will be increased, for purposes of the present invention, will be that point wherein the carbon nanofibers no longer can be characterized as graphitic. That is, the spacing can become so large that the carbon now has properties more like amorphorous carbon instead of graphite. It is important, for the practice of the present invention, that the carbon nanofibers maintain the basal plane structure representative of graphite.

A major advantage of the carbon nanofibers of the present invention, over other graphitic materials, is their flexibility with regard to modification of surface chemistry. For example, the edge regions of the nanofibers can be made either basic (introduction of $NH_4^+$ groups) or acidic (addition of $COOH^-$ groups) by use of appropriate methods. Furthermore, the presence of oxygenated groups (hydroxyl, peroxide, ether, keto or aldehyde) that are neither acidic nor basic can impart polarity to the graphite structure. Polar groups can promote the interaction of carbon edge atoms with other polar groups, such as water. As a consequence, the interaction of graphitic materials with aqueous solutions can be greatly enhanced due to the presence of acid, basic or neutral functionality.

The distribution of polar groups in active carbon (nongraphitic) occurs in a random fashion. In the graphite nanofibers of the present invention, such groups are located at the edges of the graphene layers. The addition of oxygenated groups can be achieved by selected oxidation treatments including treatment in peroxides, nitric acid, potassium permanganate, etc. Polar groups can also be eliminated by techniques such as reduction, out-gassing in vacuum at 1000° C. and treatment in hydrazine at 80° C. Following this procedure, the carbon nanofiber will become hydrophobic. E. Theodoridou, et al, Synthetic Metals 14, (1986) pages 125–135, demonstrated that very efficient surface oxidation of carbon fibers can be achieved by d.c. oxidation or repetitive anodic oxidation and cathodic reduction of the material in acidic, alkaline or neutral aqueous media. It was believed that this method had the advantage over other procedures because thick layers of surface oxides could be produced without damaging the fiber structure. These workers also capitalized on the conductive properties of graphitized carbon fibers to introduce various noble metals onto such materials via the use of electrochemical procedures. The possibility of controlling the functionality of the graphite surface could have a direct impact on both the chemistry of the supported metal particles and their morphological characteristics.

The electrode for the lithium ion battery can be made by any conventional technique. For example, the electrode can be a molded or extruded composite of suitable binders and the carbon nanofibers of the present invention, with the catalytic metal deposited thereon. The binder will typically be a polymeric material. Non-limiting examples of techniques for producing electrochemical electrodes can be found in U.S. Pat. Nos. 5,277,996; 4,851,377; and 4,263,376, all of which are incorporated herein by reference.

The present invention will be illustrated in more detail with reference to the following examples, which should not be construed to be limiting in scope of the present invention.

EXAMPLES

1. Materials

The "platelet" carbon nanofibers used for the anodic material were prepared via the decomposition of carbon monoxide/hydrogen mixtures over either iron or copper-iron powdered catalysts. The "ribbon" nanofibers were grown from the interaction of iron-nickel (6:4) with a carbon monoxide/hydrogen mixture at 600° C. The "herringbone" carbon nanofibers were produced from the decomposition of ethylene/hydrogen mixtures over copper-nickel (3:7) at 600° C. In one series of experiments "platelet" carbon nanofibers that had been grown at 600° C. were subsequently treated in argon at 2800° C. and these samples are designated "P600g".

The gases used in this work carbon monoxide (99.9%), ethylene (99.95%), hydrogen (99.999%), helium (99.99%) and argon (99.99%) were obtained from Med Tech and used without further purification. Reagent grade iron nitrate [Fe $(NO_3)_3.9H_2O$], nickel nitrate [$Ni(NO_3)_2.6H_2O$] and copper nitrate [$Cu(NO_3)_2.2.5H_2O$] were purchased from Fisher Scientific for the catalyst preparations.

2. Electrochemical Measurement

The galvanostatic charge/discharge and EVS measurements were made in a beaker-type three-electrode cell, where Li metal foil was used as the counter and reference electrode. The electrolyte used was 1 M $LiClO_4$ dissolved in ethylene carbonate + diethyl carbonate (1:1 in volume ratio). For the preparation of the carbon electrodes, 100 mg of carbon nanofiber was mixed with 7 wt.% of polymeric binder (polytetrafluoroethylene) and coated on a piece of copper exmet (long-width dimension=0.2 mm, short-width dimension=0.1 mm, size=1×1 $cm^2$). The molded carbon electrodes were then dried at 120° C. under vacuum for at least 12 hrs before use. For the galvanostatic charge/discharge cycling, a gravimetric current density of 30 mA $g^{-1}$ (equivalent to 0.3 mA $cm^{-2}$) was applied and the potential cut-off range was fixed at 0.0–2.0 or 0.0–3.0 V vs. Li/Li. The carbon electrodes were first charged (Li intercalated) from 2.0 or 3.0 to 0.0 V and the discharge experiments were made from 0.0 to 2.0 or 3.0 V without pausing. For the EVS measurements, as EG&G M362 scanning potentiostat/galvanostat and a programmable potential source was combined in order to control the applied potential step. The potential step (10 mV) was started from the open-circuit potential of the fresh cells and the sequential step was applied after the current decays down to the threshold current ($I_{threshold}$=0.02 mA). All the electrochemical experiments were carried out at ambient temperature in a glove box filled with argon (99.999%).

EXPERIMENTAL DATA

The physical properties of the various carbon materials used in this study are presented in Table 1 below. Brazilian natural graphite was used as a standard and its properties, along with those of a comparison material, carbon fibrils of U.S. Pat. No. 5,879,836 are also listed in this Table.

TABLE 1

| Carbon | XRD $d_{002}$ (nm) | $N_2$ Surface Area ($m^2$/g) |
|---|---|---|
| P600 | 0.335 | 114 |
| P670 | 0.335 | 91 |
| P600g | 0.336 | 36 |
| R700 | 0.336 | 65 |
| H550 | 0.342 | 220 |
| H650 | 0.341 | 180 |
| Carbon Fibrils | 0.345 | 350 |
| Brazilian Natural Graphite | 0.335 | 4 |

Figure 2:
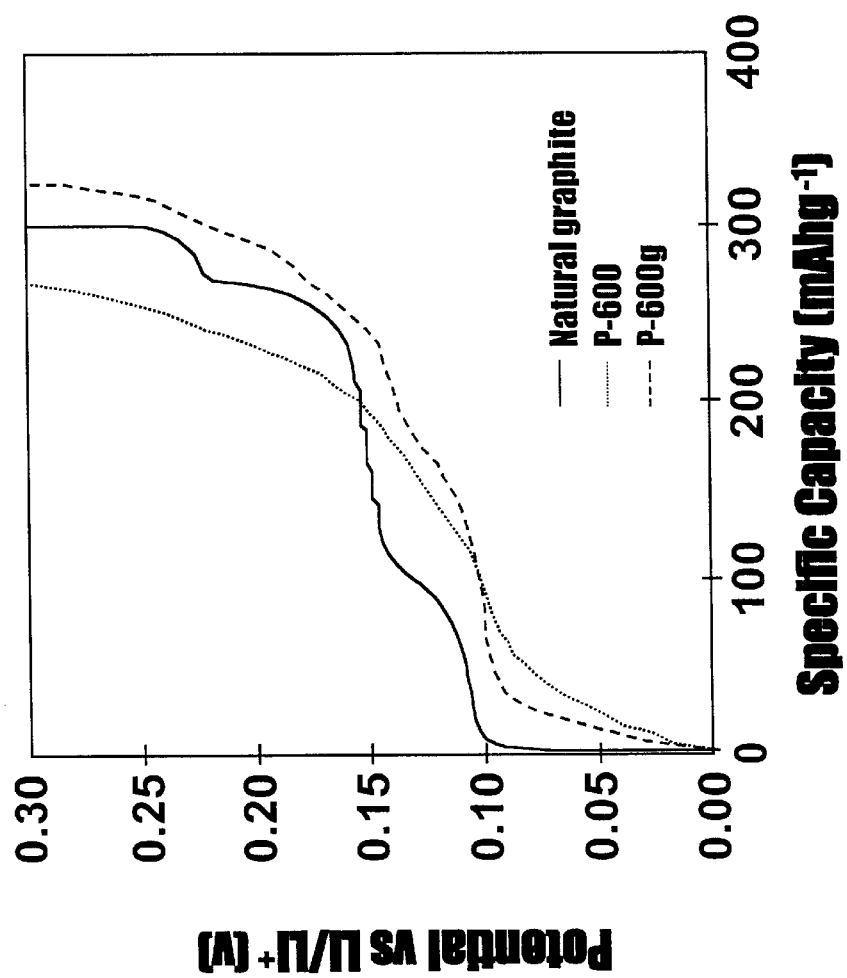
FIG. 2 shows Li+discharging profiles for P600, P600g, and Brazilian natural graphite. The discharging profile of Brazilian natural graphite showed the typical consecutive stepwise de-intercalation profile of Li-ion.

P = "Platelet";
R = "Ribbon";
H = "Herringbone;
g = treated at 2800° C.
Voltage Range[1] = 0.0 to 2.0 V and Voltage Range[2] = 0.0 to 0.3 V FIGS. 1 and 2 show the voltage profiles for the Li/carbon cells and Li+ discharging profiles on P600, P600g and Brazilian natural graphite, respectively. The discharging profile of the Brazilian natural graphite exhibits the typical consecutive stepwise deintercalation profile of Li ions. The high temperature treated P600g sample showed a relatively well-developed shape of plateau at an applied current density of 30 $mAhg^{-1}$ with several consecutive steps at higher values. In contrast, the P600 sample exhibited an unusual profile suggesting that complete intercalation of Li+ occurred by a concerted process. Further, those materials having a crystallinity of at least about 95% will have an XRD $d_{002}$ from about 0.335 to 0.338.

The complete charging and discharging data for various types of carbon nanofibers, carbon fibrils and natural graphite is presented in Table 2 below. Examination of these data shows that for the most part all the carbon nanofibers exhibit larger charging values, 493–742 $mAhg^{-1}$ than natural graphite, 494 $mAhg^{-1}$. When the discharging process was carried out over the range 0 to 2.0 V the carbon nanofibers gave values of 297 to 852 $mAhg^{-1}$, whereas the value for natural graphite was 321 $mAhg^{-1}$ when each system was fully intercalated with Li+ ions. It is evident, when the discharging step is performed over the range 0 to 0.3 V then the pattern of behavior exhibited by the "platelet" carbon nanofibers is comparable to that displayed by natural graphite. On the other hand, the performance of both "ribbon" and "herringbone" types of carbon nanofibers is significantly lower than that of the "platelet" structures. When comparative tests were carried out on carbon fibrils the performance of this material was found to be inferior to that of any of the carbon nanofiber structures of the present invention.

TABLE 2

| Carbon | Charging | Capacities (mAh/g) Discharging[1] | Discharging[2] |
|---|---|---|---|
| P600 | 575 | 363 | 278 |
| P670 | 742 | 431 | 277 |
| P670g | 532 | 367 | 324 |
| R700 | 493 | 297 | 200 |
| H550 | 1314 | 852 | 45 |
| H650 | 1338 | 601 | 110 |
| Carbon Fibrils | 2180 | 534 | 90 |
| Brazilian Natural Graphite | 494 | 321 | 300 |

P = "Platelet";
R = "Ribbon";
H = "Herringbone;
g = treated at 2800° C.
Voltage Range[1] = 0.0 to 2.0 V and Voltage Range[2] = 0.0 to 0.3 V The percentage efficiency of all the various carbons is presented in Table 3. Comparison of these data reveals that the "platelet" carbon nanofibers appear to give performances that are extremely close to that of the standard natural graphite sample. It is significant to find that "ribbon" nanofibers also give values unexpected in the art. In all cases one may conclude that the carbon nanofibers of the present invention are superior to carbon fibrils when used for the anode in lithium ion battery applications.

TABLE 3

| Carbon | % Efficiency |
|---|---|
| P600 | 63.1 |
| P670 | 58.0 |
| P600g | 69.0 |
| R700 | 60.0 |
| H550 | 64.8 |
| H650 | 49.9 |
| Carbon Fibrils | 24.5 |
| Brazilian Natural Graphite | 65.0 |

What is claimed is:

1. A lithium ion battery comprising an anode, a cathode and a lithium salt electrolyte, wherein the anode is comprised of substantially crystalline graphite carbon nanofibers comprised of graphite sheets that are aligned in directions that are perpendicular to, or parallel to the longitudinal axis of the nanofibers, wherein the distance between graphite sheets is from about 0.335 nm to about 0.67 nm, and having a crystallinity of at least about 95%, and wherein the exposed surfaces of the nanofibers are comprised of over 95% edge regions.

2. The lithium ion battery of claim 1 wherein the graphite sheets are aligned in directions that are substantially perpendicular to the longitudinal axis of the nanofiber.

3. The lithium ion battery of claim 1 wherein the cathode is comprised of a lithium transition metal oxide material.

4. The lithium ion battery of claim 3 wherein the lithium transition metal oxide material is selected from the group consisting of $LiCoO_2$, $LiNiO_2$ and $LiMnO_2$.

5. The lithium ion battery of claim 1 wherein the lithium salt electrolyte is selected from the group consisting of $LiClO_4$, $LiBF_4$, and $LiPF_6$.

6. The lithium ion battery of claim 1 wherein the crystallinity of the nanofibers is at least about 97%.

7. The lithium ion battery of claim 1 wherein the crystallinity of the nanofibers is at least about 98%.

8. The lithium ion battery of claim 1 wherein the crystallinity of the nanofibers is between about 98% and 100%.

9. The lithium ion battery of claim 2 wherein the crystallinity of the nanofibers is at least about 98%.

10. The lithium ion battery of claim 2 wherein the crystallinity of the nanofibers is between about 98% and 100%.

11. The lithium ion battery of claim 4 wherein the lithium salt electrolyte is selected from the group consisting of $LiClO_4$, $LiBF_4$, and $LiPF_6$, and the crystallinity of the nanofibers is at least about 98%.

12. The lithium ion battery of claim 11 wherein the crystallinity of the nanofibers is between about 98% and 100%.

13. The lithium ion battery of claim 12 wherein the distance between graphite sheets is from about 0.335 nm to about 0.40 nm.

* * * * *